United States Patent [19]
Isa et al.

[11] 4,051,229
[45] Sept. 27, 1977

[54] PROCESS FOR MANUFACTURING CHLORINE DIOXIDE

[75] Inventors: Isao Isa, Misato; Morioki Shibuya, Shibukawa; Makoto Ebisawa, Kiryu, all of Japan

[73] Assignee: The Japan Carlit Co., Ltd., Tokyo, Japan

[21] Appl. No.: 730,196

[22] Filed: Oct. 6, 1976

[30] Foreign Application Priority Data
July 12, 1976 Japan .................................. 51-82707

[51] Int. Cl.² ............................................. C01B 11/02
[52] U.S. Cl. ..................................... 423/478; 423/480
[58] Field of Search ................ 423/478, 480, 499, 500

[56] References Cited
U.S. PATENT DOCUMENTS

| | | | |
|---|---|---|---|
| 3,101,253 | 8/1963 | Hirshberg | 423/478 |
| 3,563,702 | 2/1971 | Partridge et al. | 423/478 |

FOREIGN PATENT DOCUMENTS

| | | | |
|---|---|---|---|
| 1,216,447 | 12/1970 | United Kingdom | 423/478 |

*Primary Examiner*—Edward Stern
*Attorney, Agent, or Firm*—Flynn & Frishauf

[57] ABSTRACT

Chlorine dioxide is generated very efficiently and safely by reducing a chlorate in a strong acid in the presence of a complex catalyst consisting of palladium (II) and a β-diketone.

20 Claims, 5 Drawing Figures

PROCESS FOR MANUFACTURING CHLORINE DIOXIDE

BACKGROUND OF THE INVENTION

1. Field of the Invention.

This invention relates to a process for manufacturing chlorine dioxide by reducing a chlorate in a strong acid in the presence of a catalyst.

2. Description of Prior Art

Chlorine dioxide is a commercially important material in such fields as pulp bleaching, water treatment and fat decoloring, and also has recently been used in the fields of denitration of industrial waste gases and removal of phenols from industrial sewage. Thus it is highly desirable to have a process by which chlorine dioxide can be manufactured economically. Further, it is desirable to have a safe process in which the generation of chlorine dioxide can be easily controlled without any danger of explosion.

One of the methods for generating chlorine dioxide is to reduce a chlorate with a reducing agent in a strong acid. The reactions which occur are exemplified below, wherein, for the sake of illustration, the chlorate used is sodium chlorate and the reducing agent is hydrochloric acid.

$$NaClO_3 + 2HCL \rightarrow ClO_2 + \tfrac{1}{2}Cl_2 + NaCl + H_2O \quad (1)$$

$$NaClO_3 + 6HCL \rightarrow 3Cl_2 + NaCl + 3H_2O \quad (2)$$

Chlorine dioxide is formed by reaction (1), but not formed by reaction (2) which competes with reaction (1).

Accordingly, reaction (1) must be accelerated in order to generate chlorine dioxide efficiently. A useful method to achieve this purpose is to use a catalyst which accelerates reaction (1) in preference to reaction (2).

Palladium was described in Japanese Patent Publication No. 2,645/1970 as a catalyst for chlorine dioxide production. Vanadium pentoxide, silver ion, manganese ion, dichromate ion and arsenic ion were described in U.S. Pat. No. 3,563,702 for the same usage. Further, for the same purpose Japanese Patent Publication Nos. 4,119/1960, 7,301/1962, 14,958/1964, 17,047/1966 disclose manganese compounds; silver ions or a combination of silver ion and manganese ion; manganese (II) chelate compounds alone or combination of manganese chelate compounds and metal sequestering agents; lead ion or a combination of lead ion, manganese ion and silver ion; respectively. It is well known in the field of this invention that the ratio of the rate of reaction (1) to that of reaction (2) decreases at lower values of the chlorate-to-reducing agent molar ratio and at lower acid concentrations of the reaction medium, although the generation of chlorine dioxide under such conditions can be controlled more easily. However, these catalysts do not have satisfactory activities under the conditions described above. Even with palladium which shows the highest activity among them, the ratio of the rate of reaction (1) to that of reaction (2) found under the following conditions scarcely exceeds the value of 17: an acid concentration of 0.4 moles per liter of the reaction medium, a chlorate-to-reducing agent molar ratio of 0.27 and a palladium (II) concentration of 0.001 mole per liter of the reaction medium.

Recently, a process for manufacturing chlorine dioxide at lower acid concentrations and at remarkably high concentrations of a reducing agent (e.g., British Pat. No. 1,347,740) has been developed. Under such reaction conditions even more active catalysts are required in order to generate chlorine dioxide without loss of efficiency.

SUMMARY OF THE INVENTION

It is an object of the invention, therefore, to provide an excellent catalyst for efficiency manufacturing chlorine dioxide, said catalyst having a high catalytic activity even under the easily controllable conditions of low acid concentrations and low chlorate-to-reducing agent molar ratios of the reaction medium.

It is another object of this invention to provide a process for efficiency manufacturing chlorine dioxide by using an excellent catalyst which has a high catalytic activity even under the easily controllable conditions of low acid concentrations and low chlorate-to-reducing agent molar ratios of the reaction medium.

Other objects and advantages of the present invention may become apparent to those skilled in the art from the following description and disclosure.

DESCRIPTION OF THE PREFERRED EMBODIMENT

This invention relates to a process for manufacturing chlorine dioxide by reducing a chlorate in a strong acid in the presence of a complex catalyst consisting of palladium (II) and a β-diketone having a general formula $$R_1-\underset{\underset{O}{\|}}{C}-\underset{\underset{R_4}{|}}{C}-\underset{\underset{O}{\|}}{C}-R_2$$

wherein $R_1$ and $R_2$ are selected from the group consisting of hydrogen, an alkyl radical having from 1 to 10 carbon atoms, and an aryl radical; and $R_3$ and $R_4$ are selected from the group consisting of hydrogen and a methyl radical.

The strong acid used in the process of this invention is selected from the group consisting of sulfuric acid, hydrochloric acid and a mixture thereof. The concentration of the sulfuric acid may be from 0.5 to 6 moles per liter of the reaction medium. The concentration of the hydrochloric acid may be from 0.01 to 4 moles per liter of the reaction medium. But if the concentration of sulfuric acid is below 0.5 or that of hydrochloric acid below 0.01 mole per liter, the rate of chlorine dioxide generation becomes too slow. On the other hand, if the concentration of sulfuric acid exceeds 6 or that of hydrochloric acid 4 moles per liter, the rate of reaction becomes too fast to assure safety.

Said chlorate is generally selected from the group consisting of sodium chlorate, potassium chlorate, calcium chlorate and magnesium chlorate. The concentration of the chlorate may be from 0.01 to 5 moles per liter of the reaction medium. If it below 0.01 mole per liter, the rate of chlorine dioxide generation becomes too slow. On the other hand, if it exceeds 5 moles per liter of the reaction medium, it becomes too fast to assure safety in operation and the loss of the expensive chlorate increases.

As said reducing agent, sulfur dioxide, methanol, sodium chloride, calcium chloride, potassium chloride or hydrochloric acid is commonly used.

Said complex catalyst consisting of palladium (II) and a $\beta$-diketone derivative is readily prepared by dissolving a palladium (II) salt and a $\beta$-diketone in water. It can be obtained in a crystalline form by neutralizing an aqueous solution containing palladium (II) and a $\beta$-diketone with an alkaline solution and by filtering.

Said $\beta$-diketone includes 2,4-pentanedione; 2,4-hexanedione; 2,4-heptanedione; 5-methyl-2,4-hexanedione; 2-ethyl-2,4-pentanedione; 2,4-octanedione; 3,5-octanedione; 5-methyl-2,4-heptanedione; 3-methyl-2,4-heptanedione; 4-methyl-3,5-heptanedione; 5,5-dimethyl-2,4-hexanedione; 2,4-nonanedione; 4,6-nonanedione; 6-methyl-2,4-octanedione; 3-methyl-2,4-octanedione; 2-methyl-3,5-octanedione; 4-methyl-3,5-octanedione; 5-ethyl-2,4-heptanedione; 6,6-dimethyl-2,4-heptanedione; 2,2-dimethyl-3,5-heptanedione; 2,4-dimethyl-3,5-heptanedione; 2,4-decanedione; 3,5-decanedione; 2-methyl-3,5-nonanedione; 5-methyl-4,6-nonanedione; 8-methyl-4,6-nonanedione; 7,7-dimethyl-2,4-octanedione; 2,7-dimethyl-3,5-octanedione; 3-isopropyl-2,4-heptanedione; 2,2,6-trimethyl-3,5-heptanedione; 3-butyl-2,4-hexanedione; 2,4-undecanedione; 4,6-undecanedione; 5,7-undecanedione; 2,4-dodecanedione; 5,7-dodecanedione; 2,4-tridecanedione; 6,8-tridecanedione; 2,4-tetradecanedione; 6,8-tetradecanedione; 1-phenyl-1,3-butanedione; 1-phenyl-1,3-pentanedione; 1Q-phenyl-2,4-hexanedione; 1-phenyl-1,3-hexanedione; 1-phenyl-3,5-hexanedione; 1-phenyl-4-methyl-1,3-pentanedione; 1-phenyl-1,3-heptanedione; 1-phenyl-4-methyl-1,3-hexanedione; 1-phenyl-2,4-nonanedione; 1,3-diphenyl-1,3-propanedione; 1-fluoro-2,4-pentanedione; 1-chloro-2,4-pentanedione; 1,5-difluoro-2,4-pentanedione; 1,1-difluoro-1-chloro-2,4-pentanedione; 1,1,1-trifluoro-2,4-pentanedione; 1,1,1,5,5,5-hexafluoro-2,4-pentanedione; 1,1-difluoro-1-chloro-2,4-hexanedione and the like.

The concentration of said complex catalyst may be from 0.00001 to 0.1 mole per liter of the reaction medium. It is below 0.00001 mole per liter, the rate of chlorine dioxide generation is not accelerated by a measurable amount. On the other hand, when it is above 0.1 mole per liter of the reaction mixture, there is no particular advantage and the production cost becomes higher.

The preferred concentration of said complex catalyst is from 0.00005 to 0.005 mole per liter of the reaction medium. The complex catalyst consisting of palladium (II) and a $\beta$-diketone of the present invention accelerates the rate of reaction (1), but does not accelerate that of reaction (2). Accordingly, the catalyst increases the conversion from the chlorate to chlorine dioxide remarkably. The ratio of reaction (1) rate to reaction (2) rate in hydrochloric acid was found to be less than 30 with any one of the conventional catalysts mentioned above, whereas a value of as high as 78 was obtained with a complex catalyst of this invention.

Advantages obtained with the present invention are as follows: The rate of reaction (1) is remarkably accelerated by adding a complex catalyst consisting of palladium (II) and a $\beta$-diketone to the reaction medium even at low acid concentrations or low chlorate-to-reducing agent molar ratio. Accordingly, the volume of the reaction vessel required for generating chlorine dioxide at a given rate can be reduced remarkably from those most frequently used in the prior art. The concentrations of the chlorate and the strong acid in the reaction medium can be reduced by adding thereto a complex catalyst consisting of palladium (II) and a $\beta$-diketone. As a result, the generation of chlorine dioxide is controlled more easily and becomes more efficient. Furthermore, abnormal generation or explosion of chlorine dioxide can be avoided, since lower reaction temperatures can be used. While the complex catalyst consisting of palladium (II) and a $\beta$-diketone alone has a remarkable catalytic activity, it can be used together with conventional catalysts, resulting in further increased activity. As such catalysts, palladium ion, vanadium pentoxide, silver ion, manganese ion, dichromate ion, arsenic ion, lead ion, and thallium ion are used.

The following examples are given to further illustrate this invention, but it should be understood that the invention is by no means limited thereto. On the contrary, they are given only to clarify some of the essential working modes of the present invention.

EXAMPLE 1

Figure 2:
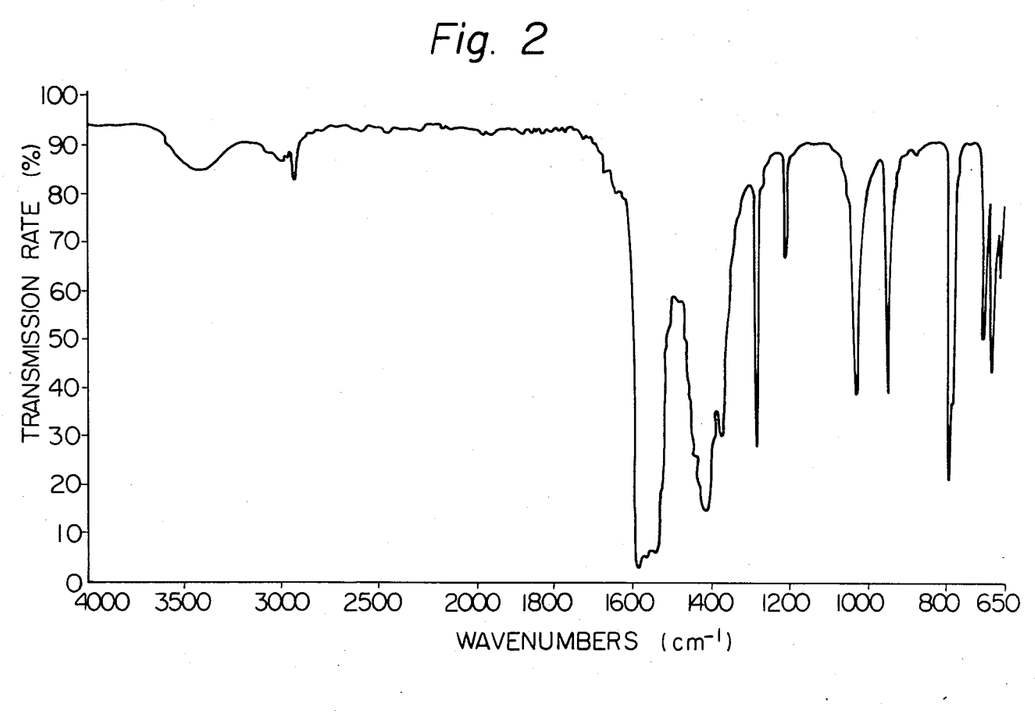
FIGS. 2 through 5 show the infrared spectra corresponding to the following systems: palladium (II) -2,4-pentanedione complex, 2,4-pentanedione, palladium (II) -1-phenyl-1,3-butanedione complex and 1-phenyl-1,3-butanedione, respectively.
Figure 3:
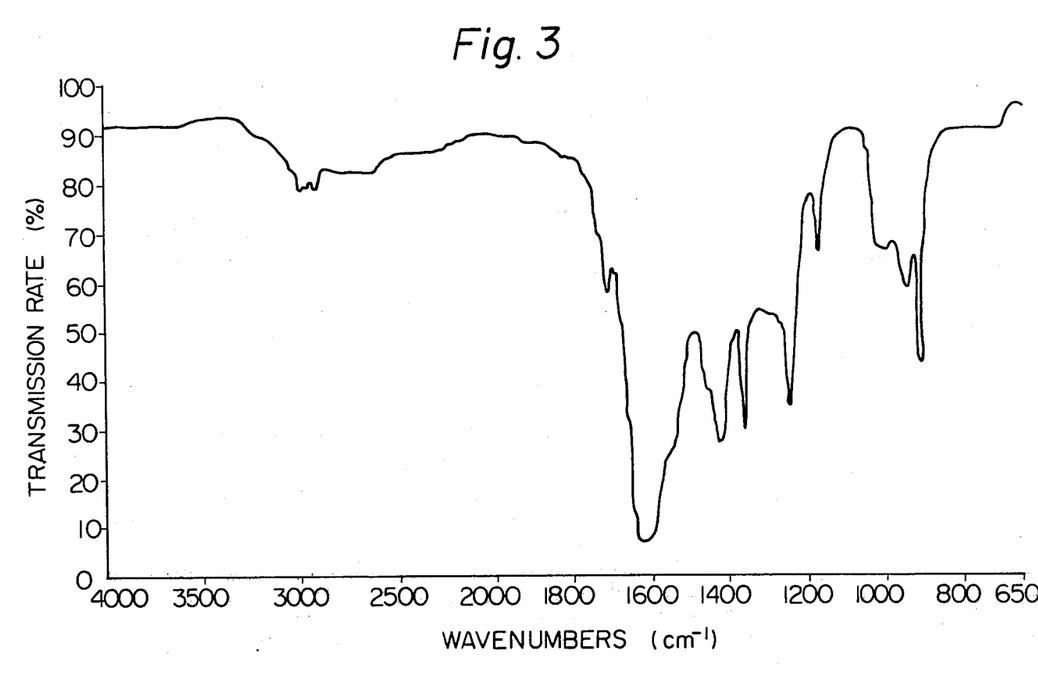

One hundred and fifty ml of an aqueous solution containing NaCl and NaClO$_3$ were charged in a four-necked flask and the solution was kept at 70° C. One hundred and fifty ml of another aqueous solution containing HCl, NaCl and palladium (II) - 2,4-pentanedione complex (It is a yellow crystal. Its melting point is 180°-181° C. Its infrared spectrum is shown in FIG. 2.) were heated up to 70° C and was added to the first solution. Thus, chlorine dioxide was generated. The composition of the reaction medium was 0.4 mol/l HCl, 100 g/l NaClO$_3$, 200 g/l NaCl and 0.01 mol/l palladium (II) - 2,4-pentanedione complex. The reaction medium was agitated by introducing air thereto at about 500 ml/min and then the reaction medium and the gas phase were analyzed every 5 minutes.

The rate at which NaClO$_3$ was consumed in reaction (1), R$_1$, was 9.17 m mol/l.min, and that in reaction (2), R$_2$, was 0.12 m mol/l.min, while the concentration of HCl decreased to 0.3 mol/l. Accordingly, the ratio of R$_1$ to R$_2$ was 77.7.

EXAMPLES 2-6

The procedure described in Example 1 was repeated except that the concentration of palladium (II) - 2,4-pentanedione complex was varied.

Table 1

| Ex. | Concentration of Pd (II) - 2,4-pentanedione complex (mol/l) | Rate at which NaClO$_3$ was consumed | | R$_1$/R$_2$ |
|---|---|---|---|---|
| | | By reaction (1) R$_1$ (m mol/l · min) | By reaction (2) R$_2$ (m mol/l · min) | |
| 2 | 0.005 | 7.05 | 0.11 | 64 |
| 3 | 0.001 | 3.74 | 0.12 | 31 |
| 4 | 0.0005 | 2.55 | 0.12 | 21 |
| 5 | 0.0001 | 1.09 | 0.11 | 9.9 |
| 6 | 0.00005 | 0.83 | 0.12 | 6.9 |

REFERENCE EXAMPLES 1-4

The procedure described in Example 1 was repeated except that PdCl$_2$ alone was used as the catalyst.

The results obtained are given in Table 2 below.

Table 2

| Reference Example | Concentration of $PdCl_2$ (mol/l) | Rate at which $NaClO_3$ was consumed | | $R_1/R_2$ |
|---|---|---|---|---|
| | | By reaction (1) $R_1$ (m mol/l · min) | By reaction (2) $R_2$ (m mol/l · min) | |
| 1 | 0.01 | 3.91 | 0.13 | 30 |
| 2 | 0.001 | 1.91 | 0.11 | 17 |
| 3 | 0.0001 | 0.71 | 0.12 | 6 |
| 4 | none | 0.24 | 0.12 | 2 |

Figure 1:
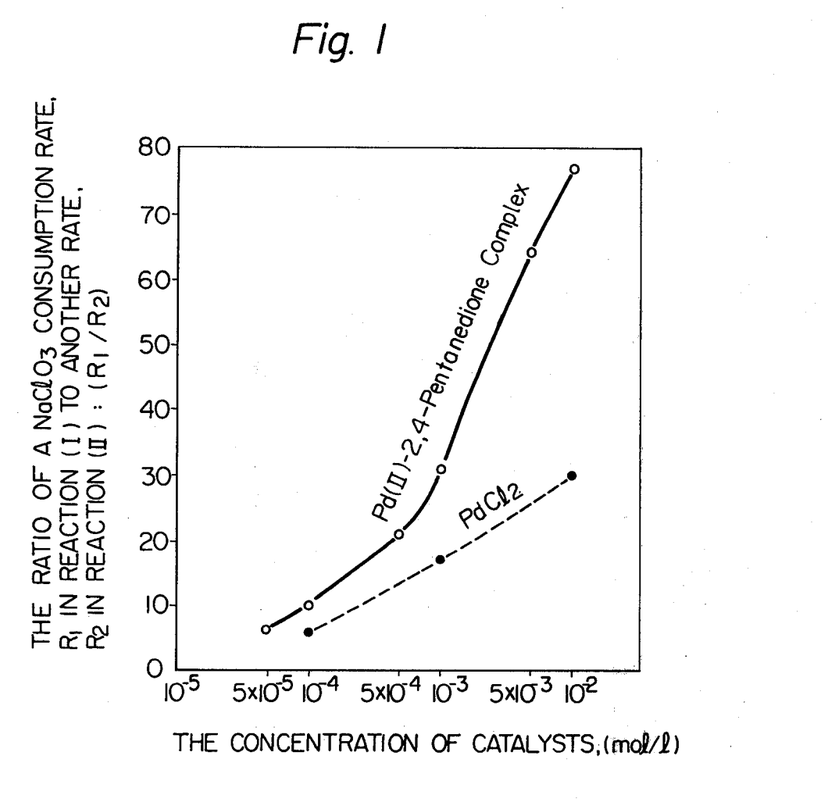
FIG. 1 shows the relation experimentally found between the ratio of a $NaClO_3$ consumption rate in the reaction (1) to another rate in the reaction (2) and the concentration of catalysts in the reaction medium.

The relation between the ratio of the rate at which $NaClO_3$ was consumed by reaction (1) to that by reaction (2) and the concentration of palladium (II) in the reaction medium of Examples 1–6 and Reference Examples 1–4 described hereinbefore as illustrated in FIG. 1.

EXAMPLE 7

Figure 4:
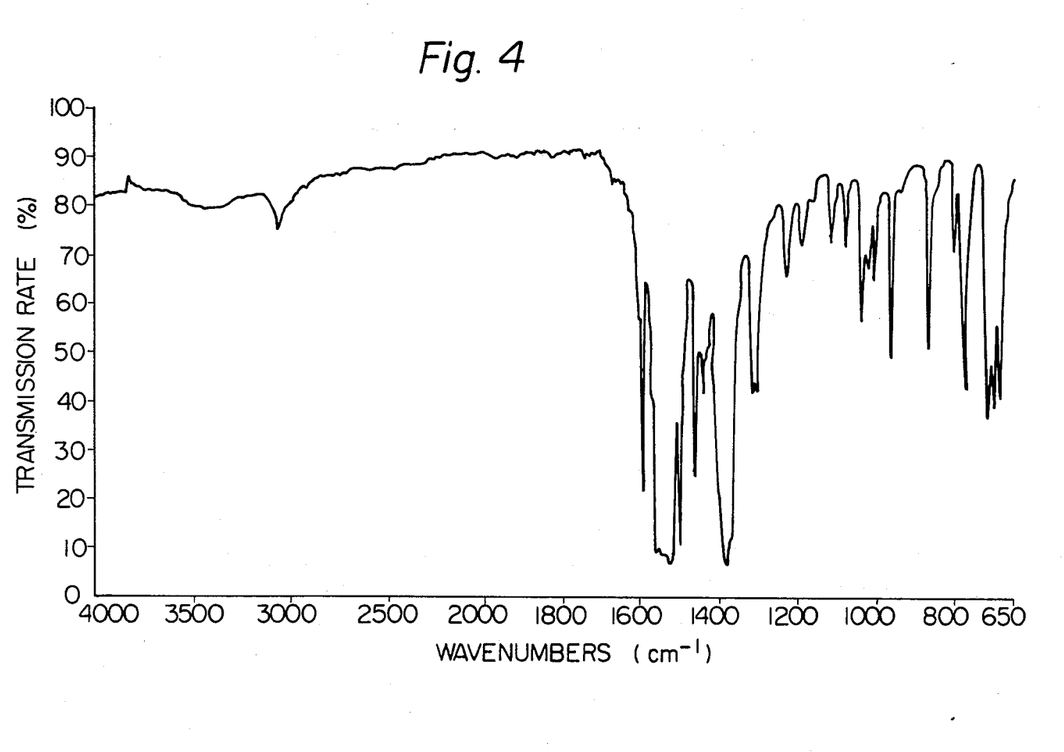
Figure 5:
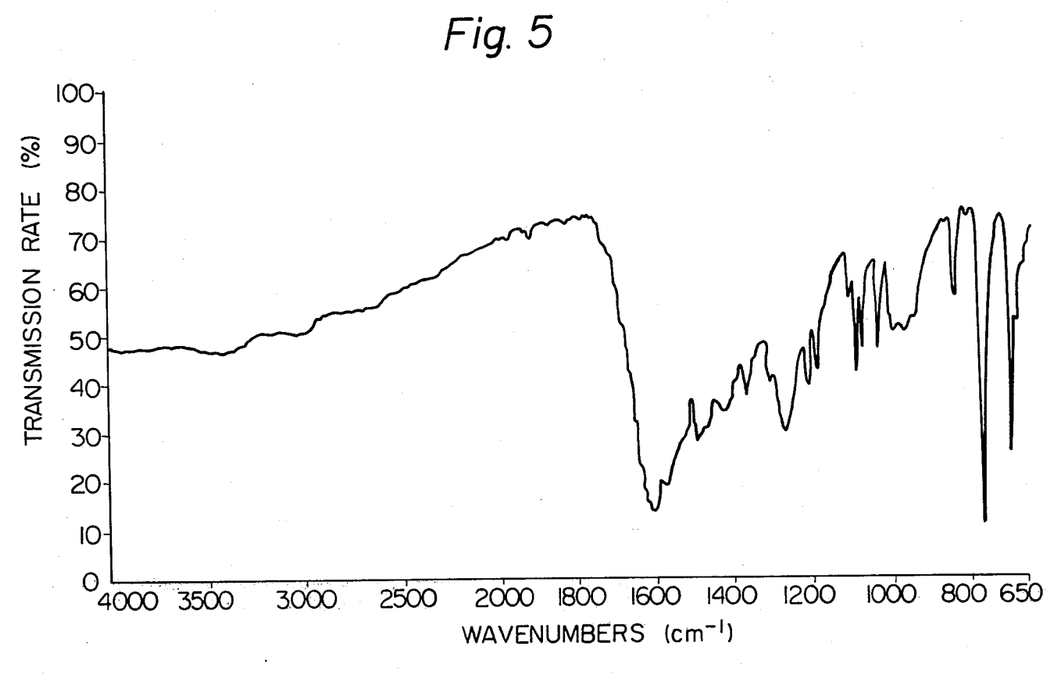

The procedure described in Example 1 was repeated except that palladium (II) - 1-phenyl-1,3-butanedione complex (It is a brown crystal. Its melting point is 158°–160° C. Its infrared spectrum is shown in FIG. 4.) was used as the catalyst.

The results obtained are given in Table 3 below.

Table 3

| Example | Complex catalysts | Concentration of complex catalyst (mol/l) | Rate at which $NaClO_3$ was consumed | | $R_1/R_2$ |
|---|---|---|---|---|---|
| | | | By reaction(1) $R_1$ (m mol/l·min) | By reaction(2) $R_2$ (m mol/l·min) | |
| 7 | Pd (II)-1-phenyl-1,3-butanedione | 0.01 | 9.01 | 0.12 | 75 |

EXAMPLES 8–12

The procedure described in Example 1 was repeated except that the catalyst was changed.

The results obtained are given in Table 4 below.

Table 4

| Example | Complex catalysts | Concentration of complex catalysts (mol/l) | Rate at which $NaClO_3$ was consumed | | $R_1/R_2$ |
|---|---|---|---|---|---|
| | | | By reaction (1) $R_1$ (m mol/l·min) | By reaction (2) $R_2$ (m mol/l·min) | |
| 8 | Pd (II) - 1,3-diphenyl-1,3-propanedione complex | 0.01 | 7.72 | 0.11 | 70 |
| 9 | Pd (II) - 1,1,1,-5,5,5-hexafluoro-2,4-pentanedione complex | 0.01 | 9.81 | 0.10 | 98 |
| | Pd (II) - 4,6-undecanedione complex | 0.01 | 8.78 | 0.11 | 80 |
| 11 | Pd (II) - 1-chloro-2,4-pentanedione complex | 0.01 | 9.36 | 0.13 | 72 |
| 12 | Pd (II) - 3-methyl-2,4-pentanedione complex | 0.01 | 9.46 | 0.12 | 79 |

EXAMPLE 13

One hundred and fifty ml of an aqueous solution containing $NaClO_3$ and $NaCl$ were charged in a four-necked flask and the solution was kept at 70° C. One hundred and fifty ml of another aqueous solution containing $H_2SO_4$ and palladium (II) - 2,4-pentanedione complex were heated up to 70° C and added to the first solution. Thus, chlorine dioxide was generated. The composition of the reaction medium was 2 mol/l $H_2SO_4$, 100 g/l $NaClO_3$, 50 g/l Nacl and 0.001 mol/l palladium (II) - 2,4-pentanedione complex. The reaction mixture was agitated by introducing air thereinto at about 1500 ml/min and then the reaction medium and the gas phase were analyzed every 5 minutes.

The rate at which $NaClO_3$ consumed in reaction (1), $R_1$ was 25.0 m mol/l.min, and that in reaction (2), $R_2$ was 0.27 m mol/l.min, when the concentration of $H_2SO_4$ decreased to 1.75 mol/l. Accordingly, the ratio of $R_1$ to $R_2$ was 93.

REFERENCE EXAMPLE 5

The procedure described in Example 13 was repeated except that palladium (II) was used as the catalyst.

The rate at which $NaClO_3$ consumed in reaction (1), $R_1$ was 13 m mol/l.min, and that in reaction (2), $R_2$ was 0.26. Accordingly, the ratio of $R_1$ to $R_2$ was 50.

EXAMPLES 14–17

The procedure described in Example 1 was repeated except that a combination of a complex catalyst and a conventional catalyst was used as a catalyst.

The results obtained are given in Table 5 below.

Table 5

| Example | Concentration of catalysts | | at which NaClO₃ was consumed | | |
|---|---|---|---|---|---|
| | Pd(II)-2,4-pentanedione complex (mol/l) | Conventional catalyst (mol/l) | By reaction (1) $R_1$ (m mol/l·min) | By reaction (2) $R_2$ (m mol/l·min) | $R_1/R_2$ |
| 14 | $10^{-3}$ | Pd(II) $10^{-3}$ | 6.02 | 0.12 | 50 |
| 15 | $10^{-3}$ | Mn(II) $10^{-3}$ | 4.62 | 0.11 | 42 |
| 16 | $10^{-3}$ | Pb(II) $10^{-2}$ | 4.42 | 0.11 | 40 |
| 17 | $10^{-3}$ | Tl(II) $10^{-2}$ | 5.35 | 0.12 | 45 |

REFERENCE EXAMPLES 6–8

The procedure described in Examples 15–17 was repeated except that the conventional catalyst alone was used as a catalyst.

The results obtained are given in Table 6 below.

| Reference Example | Concentration of conventional catalysts (mol/l) | Rate at which NaClO₃ was consumed | | $R_1/R_2$ |
|---|---|---|---|---|
| | | By reaction (1) $R_1$ (m mol/l · min) | By reaction (2) $R_2$ (m mol/l · min) | |
| 6 | Mn $10^{-3}$ | 1.00 | 0.11 | 9 |
| 7 | Pb $10^{-2}$ | 0.55 | 0.10 | 6 |
| 8 | Tl $10^{-2}$ | 0.22 | 0.10 | 2 |

EXAMPLE 18

The procedure described in Example 13 was repeated except that palladium (II)-2,4-pentanedione and silver (I) ion were used as a catalyst.

The concentrations of palladium(II)-2,4-pentanedione and silver (I) in the reaction medium were $10^{-3}$ and $10^{-4}$ mol/l, respectively. The rate at which NaClO₃ consumed in reaction (1), $R_1$, was 32.5 m mol/l.min, and that in reaction (2), $R_2$, was 0.25. Accordingly, the ratio of $R_1$ to $R_2$ was 128.

REFERENCE EXAMPLE 9

The procedure described in Example 18 was repeated except that silver (I) was used as a catalyst.

The concentration of silver (I) in the reaction medium was $10^{-4}$ mol/l. The rate at which NaClO₃ consumed in reaction (1), $R_1$, was 7.98 m mol/l.min, and that in reaction (2), $R_2$, was 0.25. Accordingly, the ratio of $R_1$ to $R_2$ was 32.

What is claimed is:

1. A process for manufacturing chlorine dioxide by reducing a chlorate selected from the group consisting of sodium chlorate, potassium chlorate, calcium chlorate and magnesium chlorate, in a strong acid selected from the group consisting of sulfuric acid present in a concentration of from about 0.5 to about 6 moles per liter of reaction medium, hydrochloric acid in a concentration of from about 0.01 to about 4 moles per liter of reaction medium and a mixture thereof, in the presence of a complex catalyst consisting of palladium (II) and a β-diketone of the formula wherein $R_1$ and $R_2$ are selected from the group consisting of hydrogen, an alkyl radical having from 1 to 10 carbon atoms and an aryl radical; and $R_3$ and $R_4$ are selected from the group consisting of hydrogen and a methyl radical.

2. A process of claim 1 in which said β-diketone is 2,4-pentanedione.

3. The process of claim 1 in which said β-diketone is 1-phenyl-1,3-butanedione.

4. The process of claim 1 in which said β-diketone is 1,3-diphenyl-1,3-propanedione.

5. The process of claim 1 in which said β-diketone is 1,1,1,5,5,5-hexafluoro-2,4-pentanedione.

6. The process of claim 1 in which said β-diketone is 1-chloro-2,4-pentanedione.

7. The process of claim 1 in which said β-diketone is 3-methyl-2,4-pentanedione.

8. The process of claim 1 in which said β-diketone is 4,6-undecanedione.

9. The process of claim 1 in which said complex catalyst is present in a concentration of from about 0.00001 to about 0.1 mole per liter of the reaction medium.

10. The process of claim 1 in which said complex catalyst is present in a concentration of from about 0.00005 to about 0.005 mole per liter of the reaction mixture.

11. The process of claim 1 in which said strong acid is said sulfuric acid.

12. The process of claim 1 in which said strong acid is said hydrochloric acid.

13. The process of claim 1 in which a combination of the complex catalyst and additional palladium ion is used as a catalyst.

14. The process of claim 1 in which a combination of the complex catalyst and silver ions is used as a catalyst.

15. The process of claim 1 in which a combination of the complex catalyst and maganese ion is used as a catalyst.

16. The process of claim 1 in which a combination of the complex catalyst and lead ion is used as a catalyst.

17. The process of claim 1 in which a combination of the complex catalyst and thallium ion is used as a catalyst.

18. The process of claim 1, in which said β-diketone is selected from the group consisting of 2,4-pentadione; 1-phenyl-1,3-butanedione; 1,3-diphenyl-1,3-propanedione; 1,1,1,5,5,5-hexafluoro-2,4-pentanedione; 1-chloro-2,4-pentanedione; 3-methyl-2,4-pentanedione; and 4,6-undecanedione.

19. The process of claim 1, wherein the chlorate is sodium chlorate.

20. The process of claim 1, wherein the chlorate is reduced with a reducing agent selected from the group consisting of sulfur dioxide, methanol, sodium chloride, calcium chloride, potassium chloride and hydrochloric acid.

* * * * *

UNITED STATES PATENT AND TRADEMARK OFFICE
CERTIFICATE OF CORRECTION

PATENT NO. : 4,051,229
DATED : September 27, 1977
INVENTOR(S) : ISAO ISA et al

It is certified that error appears in the above-identified patent and that said Letters Patent are hereby corrected as shown below:

Column 1, line 28: in equation (1), replace "2HCL" with ---2HCl---.

Column 1, line 29: in equation (2), replace "NaCLO$_3$" with ---NaClO$_3$---; replace "6HCL" with ---6HCl---.

Column 3, line 2: after "it", insert ---is---.

Column 3, line 36: replace "1Q-phe" with ---1-phe---.

Column 5, Tables 3 and 4: underscore "Rate at which NaClO$_3$ was consumed---.

Column 5, Table 4: in the "Example" column, next to "Pd(II)-4,6-", insert ---10---.

Column 7, Table 5: before "at which..." in the heading, insert ---Rate---.

UNITED STATES PATENT AND TRADEMARK OFFICE
CERTIFICATE OF CORRECTION

PATENT NO. : 4,051,229
DATED : September 27, 1977
INVENTOR(S) : ISAO ISA et al

It is certified that error appears in the above-identified patent and that said Letters Patent are hereby corrected as shown below:

Column 7, Table 6: insert ---Table 6--- over the Table.

Signed and Sealed this

Fifteenth Day of August 1978

[SEAL]

Attest:

RUTH C. MASON
Attesting Officer

DONALD W. BANNER
Commissioner of Patents and Trademarks